US005383604A

United States Patent [19]

Boesch

[11] Patent Number: 5,383,604

[45] Date of Patent: Jan. 24, 1995

[54] WATER OUTLET HEAD FOR A SANITARY FITTING

[75] Inventor: Paul Boesch, Ebnat-Kappel, Switzerland

[73] Assignee: H. Weidmann AG, Rapperswil, Switzerland

[21] Appl. No.: 190,527

[22] Filed: Feb. 2, 1994

[30] Foreign Application Priority Data

Sep. 24, 1993 [DE] Germany ............................ 9314443

[51] Int. Cl.⁶ ........................... E03C 1/04; E03C 1/08; B05B 1/18; F16K 11/00

[52] U.S. Cl. ..................................... 239/447; 239/449

[58] Field of Search ................................ 239/443–449; 137/881, 882; 251/111, 113

[56] References Cited

U.S. PATENT DOCUMENTS 4,629,124 12/1986 Gruber ................................ 239/447
5,145,114 9/1992 Mönch ................................ 239/447

FOREIGN PATENT DOCUMENTS 3222968 12/1983 Germany ............................ 239/447
3637470 5/1988 Germany ............................ 239/447
4118540 12/1992 Germany ............................ 239/447
646499 11/1984 Switzerland .

*Primary Examiner*—Karen B. Merritt
*Attorney, Agent, or Firm*—Sughrue, Mion, Zinn, Macpeak and Seas

[57] ABSTRACT

A hand held water outlet head includes a piston 10 carrying a valve disk 8 movable between two seats 6,7 for selectively directing an incoming water flow to either an aerator nozzle 17 via ducts 41,44,46, or to shower outlets 47 concentrically surrounding the nozzle via ducts 42,43.The piston/valve disk position is controlled by the thumb depression of a diaphragm 34 overlying a rocker arm 29, whose one end 32 is coupled to the piston and whose other end 31 may be latched by a slider 21. Incoming water pressure holds the disk in the shower position against the force of a spring 11, which returns the disk to the nozzle position when the water is turned off, unless the rocker arm is latched by the slider.

15 Claims, 3 Drawing Sheets

WATER OUTLET HEAD FOR A SANITARY FITTING

BACKGROUND OF THE INVENTION

This invention relates to a water outlet head for a sanitary fitting having a shower outlet and a jet outlet, comprising a diverter valve and a manual operator with an elastic cover cap mounted in a housing.

A water outlet head of this type is disclosed in DE-A-36 37 470. It has a jet outlet and a shower outlet which can be used by choice, wherein, when the water flow is turned off, an automatic resetting to the desired switch position takes place. The shower outlet and the jet outlet have separate valves, which are connected together by a rocker arm and which can be operated by pressing on the outside of the cover cap. In this design the two outlets have to be arranged side-by-side at a specific distance, a feature that in some designs is significantly less favorable than a concentric arrangement of the two outlets.

CH-A-646 499 discloses a water outlet head, where the jet outlet is arranged concentrically to the shower outlet. With this water outlet it is possible to prevent the automatic resetting of the diverter valve before turning off the water flow. However, a gripping head has to be rotated into a predetermined position, and such rotation is hardly possible with one hand.

SUMMARY OF THE INVENTION

This invention provides a water outlet head of the aforementioned type, which can be operated with one hand in a simple and ergonomic manner, which enables a selective readjustment between the jet and shower positions, and, in addition, also allows the option of turning off the automatic reset. It is also possible to arrange the jet outlet concentrically within the shower outlet.

The invention solves the problem with this class of water outlets by arranging a slider below the cover cap, the slider being adjustable by pressing on the outside of the cap between a basic neutral position and a position in which the diverter valve is latched in the shower position.

All three of the aforementioned functions can be actuated by pressing on the outside of the cover cap. The corresponding bank of touch controls can be arranged in such a manner that all functions are possible with the thumb with only small thumb movements. If the position to move the slider is centered relative to the cover cap, then it is possible with a single pressure movement to switch the diverter valve from the jet position into the shower position and simultaneously to prevent the automatic reset. Another especially compact design is achieved if, according to another aspect of the invention, the manual operator exhibits a rocker arm, which is connected at one end to a valve piston of the diverter valve and which with the other end interacts with the slider. The rocker arm is arranged underneath the cover cap such that it can be rocked directly from the cover cap at both ends, which enables an especially compact design.

DETAILED DESCRIPTION OF THE PREFERRED EMBODIMENT

Figure 1:
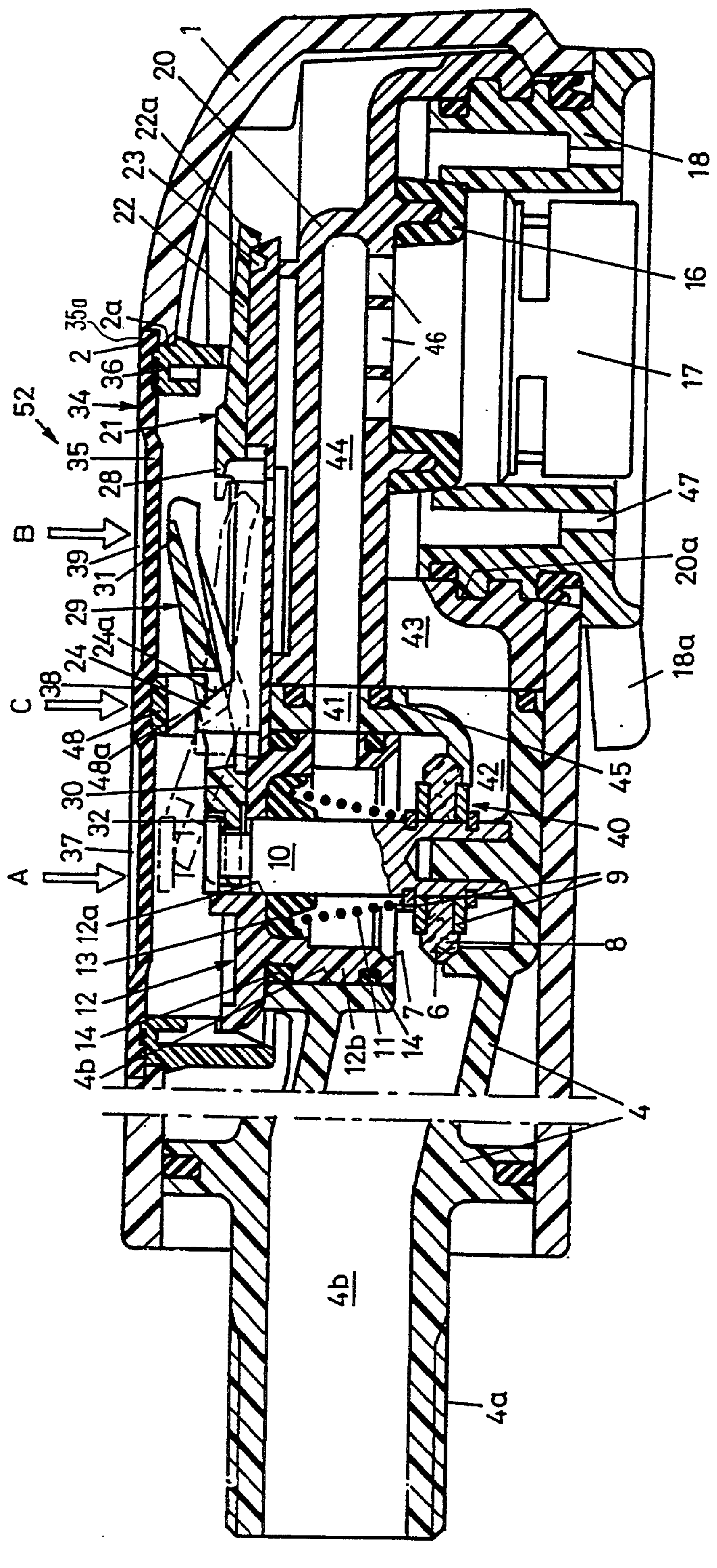
FIG. 1 is a longitudinal sectional view of a water outlet head according to the invention.

A branch fitting 4, which is to be connected by a threaded socket 4*a* to a flexible water pipe or hose (not shown), is installed in a housing 1. A duct 4*b* of the branch fitting leads to a diverter valve 40, which has two valve seats 6 and 7, which are conical in opposite directions, and a valve piston 10 fitted with a valve disk 8. The disk 8 is attached to the piston 10 with two holding disks 9. The piston 10 can be moved in an opening 12*a* of a bearing member 12 and sealed against the outside of the opening 12*a* by a gasket 13. The bearing member 12 is fixed on the branch fitting 4 with latches (not shown) and reaches with an extension 12*b*, which is open on the side and at the bottom, into the duct 4*b* of the branch fitting. The extension 12*b* is sealed by O-rings 14 with respect to the branch fitting 4.

The front end of the branch fitting 4 is provided with an upper opening 41 leading to a duct 44, and a larger bottom opening 42, which leads into a duct 43 of a head piece 20 connected by screws (not shown) to the branch fitting 4. A seal 45 inserted between the parts 4 and 20 seals the two ducts 43 and 44. The duct 44 leads through openings 46 of the head piece 20 to an aerator nozzle 17, in which a jet of fine beads is formed as the water issues from said nozzle. The nozzle 17 is inserted into a screen element 18 enveloping it concentrically and seals by means of a gasket 16 against the outside of the duct 44. The screen element 18 is inserted into an opening 20*a* of the head piece 20 and forms with projections of the head piece 20 a bayonet lock. By rotating the screen element 18 with an integral handle 18*a*, the screen element 18 can be removed for cleaning. The duct 43 of the head piece 20 leads to several bores 47, which are arranged circularly around the nozzle 17. The bores 47 form a shower outlet. If the valve disk 8 is in the position shown in FIG. 1, then water flowing in through the socket 4*a* into the duct 4*b* is led through the extension 12*b* into the duct 44 and flows from there through the openings 46 to the nozzle 17 and leaves it finally as a jet of fine beads. If at this stage the valve disk 8 and the piston 10 are moved against the force of a compression spring 11 into the upper position shown with the dash-dot lines, then the passage through the extension 12*b* is closed and the water flowing in through the duct 4*b* flows into the ducts 42 and 43, and finally out through the shower bores 47.

Figure 2:
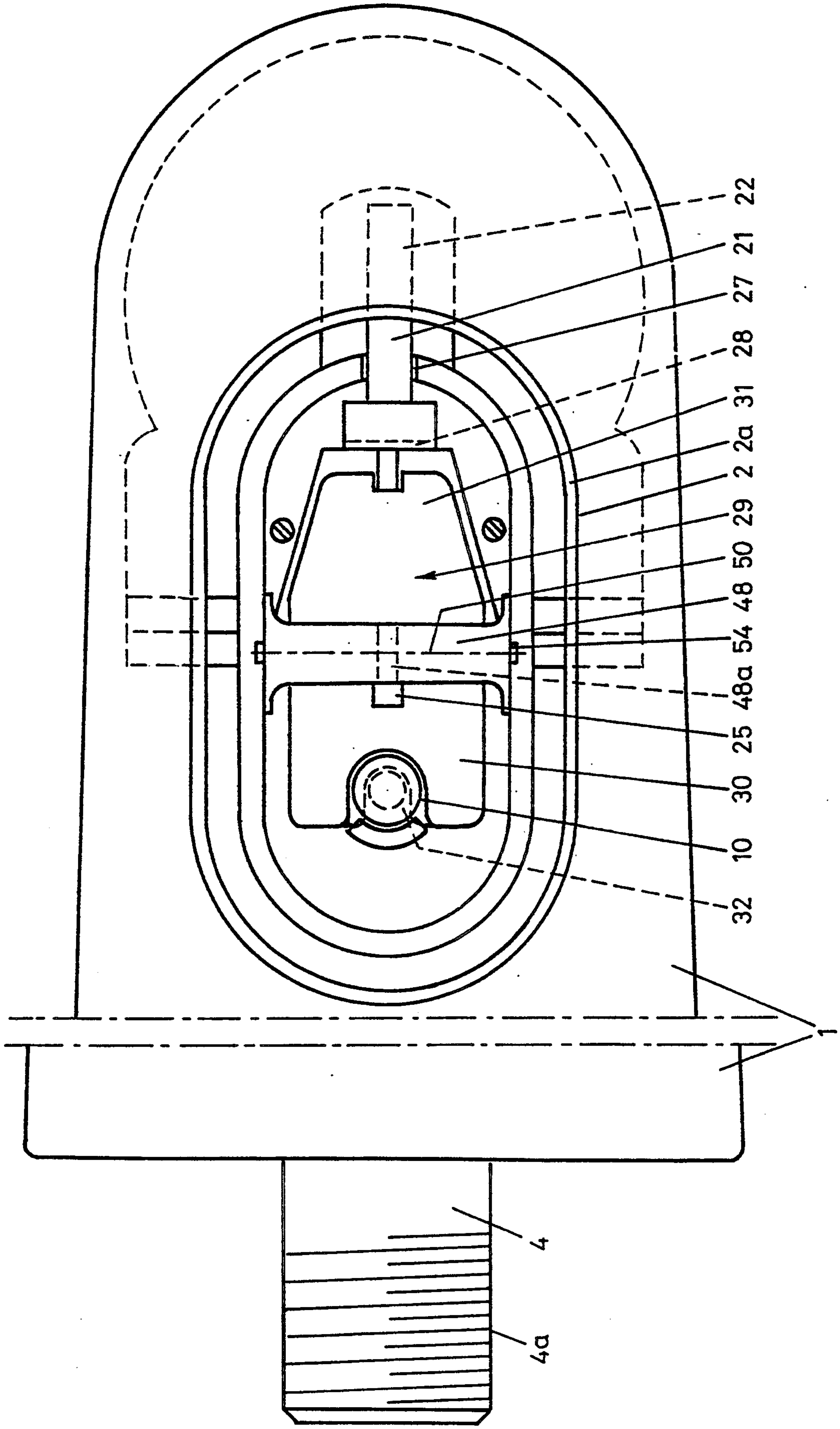
FIG. 2 is a top view of the water outlet head of FIG. 1, with the cover cap omitted.
Figure 3:
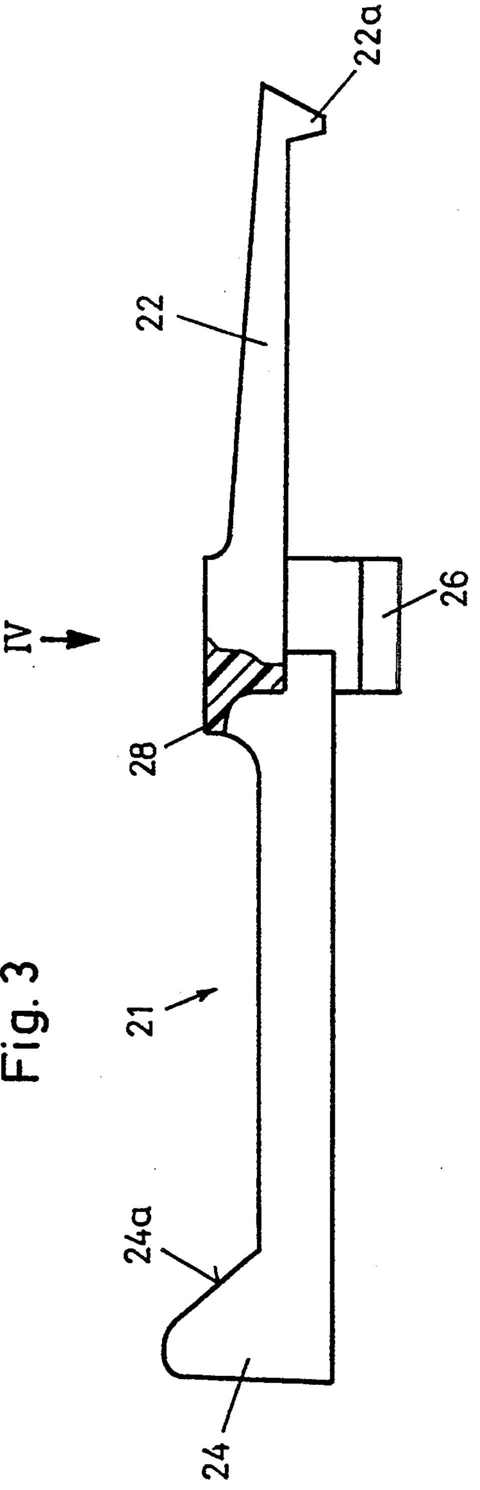
FIG. 3 is a fragmented side view of the slider.
Figure 4:
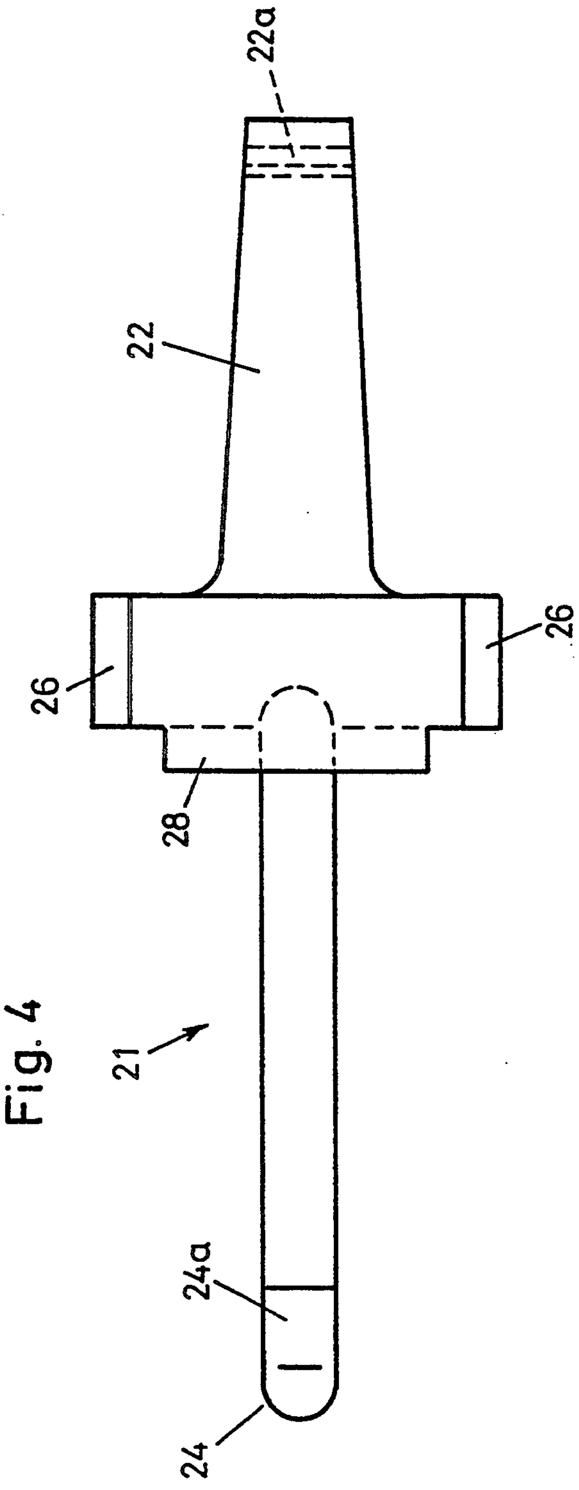
FIG. 4 is a top view of the slider.

To actuate the diverter valve 40 there are a rocker arm 29, a slider 21 and a web 48 underneath a cover cap 34 on the bearing member 12. The rocker arm 29 is connected by a lever arm 30 to the upper end of the valve piston 10. The arm 30 has a recess 32, into which the upper end of the valve piston 10 is inserted. The rocker arm 29 also has side journals (not shown), by which it is mounted to the bearing member 12 such that it can be swivelled around the axis 50 shown in FIG. 2.

Above the rocker arm 29 is the web 48, which bridges the rocker arm 29 (FIG. 2) approximately in the center of the tilt axis 50, and whose ends are locked into position at the bearing member 12. A cam 48*a*, moulded-on approximately in the center of the underside of the web 48, engages from the top with a slot 25 of the rocker arm, whereas a cam 24 of the slider 21 engages from the bottom with the slot 25, as shown in FIG. 1. The slider 21 is mounted movably to a limited degree in its longitudinal direction on the bearing member 12 by means of guide links 26 in slots 27 of the bearing member 12 and held in such a manner that it cannot be lifted upwardly from the bearing member. The underside of an elastically spring tongue or latch 22 has a stop cam 22*a*, which can be snapped into a depression 23 of the bearing member 12.

The slider 21 forms with the rocker arm 29 and the web 48 a manual operator 52, which is arranged below the cover cap 34 and can also be operated by pressing on the outside of the cap. The cap 34 has a peripheral lip or carrier 36, which is preferably made of a comparatively hard plastic and which is extruded on a rubber-elastic diaphragm 35. The diaphragm is installed by the carrier 36 into an opening 2 of the housing 1 and locked into position, as shown in FIG. 1. A peripheral rim 35*a* of the diaphragm, which protrudes relative to the carrier 36, rests against a shoulder 2*a* of the housing and seals the cover cap with respect to the housing.

In operation, when the water outlet is used, it is held with one hand at the housing 1, whereby the thumb of this hand is usually over the cover cap 34. If the valve disk 8 is in the position shown with the solid lines, then water flowing in through the duct 4*b* leaves the nozzle 17 as an aerated jet of water. To change over into the shower mode, a touch depression 39 of the diaphragm is depressed with the thumb in the direction of arrow B, and the rocker arm 29 at the arm 31 is swivelled into the position shown with the dash-dot lines. In so doing, the piston 10 is moved to the top with the valve disk 8 against the force of the compression spring 11, until the valve disk 8 rests against the valve seat 7. Water flowing in through the duct 4*b* is now led through the ducts 42 and 43 to the bores 47. If the rocker arm 29 is released, the valve disk 8 remains in the upper position, despite the downwardly acting force of the spring 11, due to the high pressure of water in the duct 4*b*. If a discharge through the nozzle 17 is desired again, another touch depression 37 of the diaphragm is depressed with the thumb in the direction of arrow A, and the rocker arm 29 at the lever arm 30 is swivelled back into the position shown with the solid lines. The valve disk 8 is moved against the water pressure onto the valve seat 6, so that the water flows through the extension 12*b* to the nozzle 17.

The valve disk also moves automatically downwardly onto the valve seat 6, if the water in the duct 4*b* falls below a specific pressure, for example 0.3 bar, whereat the downwardly acting force of the spring 11 is greater than the upward acting force of the water. The result is that when the water flow is turned off, there is an automatic reset.

If at this stage such an automatic reset is not desired, the rocker arm 29 can be stopped in the position shown with the dash-dot lines. To do this the diaphragm 35 is depressed with the thumb in the direction of arrow C between the two touch depressions 37 and 39 in a region 38. Thus, the web 48 is moved downwardly, whereby its extension 48*a* runs down the inclined surface 24*a* of the cam 24 and thus moves the slider 21 to the left in FIG. 1, and a retainer lip 28 is moved over the free end of the lever arm 31. At the same time, the cam 22*a* is snapped into the depression 23 subject to the elastic deflection of the tongue 22. The slider 21 is thus locked, which fixes the rocker arm 29 in the position shown with the dash-dot lines. Even if the water flow is turned off, the arm 31 remains latched in this position, with the valve disk 8 and the piston 10 lifted.

The diaphragm 35 can also be depressed simultaneously in both the depression 39 and in region 38, so that the arm 29 is swivelled into the position shown by the dash-dot lines and is simultaneously fixed in position by moving the slider 21. Therefore, the diverter valve 40 can be readjusted by a simple depression of the thumb from the jet position into the fixed or latched shower position. The latching can be released in a simple manner by depressing the diaphragm 35 at the touch depression 37. By means of the pressure thus exerted on the lever arm 30, the other lever arm 31 is pressed upwardly against the lip 28 and thus the slider is moved to the right in FIG. 1, until the cam 22*a* reaches the foremost stop position. From this position the device can be operated as desired without latching it into any position, and thus with automatic reset.

I claim:

1. Water outlet for a sanitary fitting, said outlet comprising: at least one shower outlet (18) and one jet outlet (17), a diverter valve (40), and a manual operator (52) having an elastic cover cap (34) mounted in a housing (1), wherein a slider (21) is disposed below the cover cap, said slider being movable by pressing on the outside of the cap between a basic neutral position and a position in which the diverter valve is latched in a shower position, and wherein the manual operator comprises a rocker arm (29) connected at one end (30) to a piston (10) of the diverter valve and having another, opposite end (31) which interacts with the slider.

2. Water outlet, as claimed in claim 1, wherein said ends of the rocker arm are displaceable between two tilt positions below the cover cap.

3. Water outlet, as claimed in claim 2, wherein the slider (21) is longitudinally movable on a bearing member (12).

4. Water outlet, as claimed in claim 3, wherein the slider may be detachably retained in the neutral position by a stop **(22*a*,23)**.

5. Water outlet, as claimed in claim 4, wherein the slider has an extension (28), which can be moved over the rocker arm to latch the rocker arm (29) in the shower position.

6. Water outlet, as claimed in claim 1, wherein a camming web (48) is disposed directly below the cover cap (34) for engagement with and to move the slider.

7. Water outlet, as claimed in claim 6, wherein the web (48) extends across the rocker arm.

8. Water outlet, as claimed in claim 7, wherein an underside of the web defines a cam **(48*a*) which interacts with an inclined surface (24*a*)** of the slider to move the slider.

9. Water outlet, as claimed in claim 1, wherein the cover cap (34) comprises an elastic diaphragm (35) having a comparatively hard plastic lip (36) around its periphery.

10. Water outlet, as claimed in claim 9, wherein the lip is fixed into position by snapping into an opening (2) of the housing (1) and a rim of the elastic diaphragm rests sealingly on the housing.

11. Water outlet, as claimed in claim 1, wherein the slider (21) can be moved into the latched shower position by applying pressure on a central position of the cover cap.

12. A manually operable, hand held water outlet head, comprising:

a) housing means (1,4) having an inlet duct (4*b*) adapted to be connected to a flexible water supply hose, b) a jet nozzle (17) mounted in the housing means, c) a plurality of shower nozzles (47) mounted in the housing means, concentrically surrounding the jet nozzle, d) a diverter valve (40) mounted in the housing means for selectively directing incoming water to the jet nozzle or to the shower nozzles, e) a centrally pivotable rocker arm (29) mounted in the housing means, and having one end operably coupled to the diverter valve, f) an elongate, longitudinally movable slider (21) disposed in the housing means, and engageable with another, opposite end of the rocker arm to latch said arm and the diverter valve in a first position whereat incoming water is directed to the shower nozzles, g) depressible cam means (48) disposed overlying a pivot axis of the rocker arm for moving the slider into a latching position, and h) a flexible diaphragm (34) sealingly mounted to the housing means and overlying the ends of the rocker arm and the cam means to enable their selective depression by a user's finger.

13. A water outlet head according to claim 12, further comprising spring means (11) for biasing the diverter valve towards a second position whereat incoming water is directed to the jet nozzle.

14. Water outlet for a sanitary fitting, said outlet comprising: at least one shower outlet (18) and one jet outlet (17), a diverter valve (40), and a manual operator (52) having an elastic cover cap (34) mounted in a housing (1), wherein a slider (21) is disposed below the cover cap, said slider being movable between a basic neutral position and a position in which the diverter valve is latched in a shower position, wherein the cover cap (34) comprises an elastic diaphragm (35) having a comparatively hard plastic lip (36) around its periphery, and wherein the lip is fixed into position by snapping into an opening (2) of the housing (1) and a rim of the elastic diaphragm rests sealingly on the housing, and further comprising cam means (48*a*) disposed between the cover cap diaphragm and the slider for interacting with the slider to move the slider between the neutral position and the position in which the diverter valve is latched in the shower position by applying pressure on the diaphragm.

15. A water outlet for a sanitary fitting, said outlet comprising: at least one shower outlet (18) and one jet outlet (17), a diverter valve (40) operable by an associated piston (10), a manual operator (52) having an elastic cover cap (34) mounted in a housing (1), and a slider (21) disposed below the cover cap, said slider being movable by pressing on the outside of the cap between a basic neutral position and a position in which the diverter valve is latched in a shower position, wherein the slider, in a position in which the diverter valve is in the shower position, latches the piston, and wherein the manual operator comprises means (48) for interacting with the slider to move the slider by applying pressure on the cover cap.

* * * * *